(12) United States Patent
Trapani et al.

(10) Patent No.: US 6,630,970 B2
(45) Date of Patent: Oct. 7, 2003

(54) POLARIZERS FOR USE WITH LIQUID CRYSTAL DISPLAYS

(75) Inventors: Giorgio Trapani, Cambridge, MA (US); William K. Smyth, Sudbury, MA (US); Philip Ralli, Sudbury, MA (US); James Gordon, Newton, MA (US); John Cael, Upton, MA (US); John C. Branca, Franklin, MA (US); David M. Foresyth, Plainville, MA (US); Atsushi Suzuki, Westborough, MA (US); William Pugh, Naperville, IL (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/897,318

(22) Filed: Jul. 2, 2001

(65) Prior Publication Data

US 2003/0001987 A1 Jan. 2, 2003

(51) Int. Cl.[7] .............................................. G01F 1/1336
(52) U.S. Cl. ......................................... 349/96; 359/483
(58) Field of Search ..................... 349/96–103; 359/483

(56) References Cited

U.S. PATENT DOCUMENTS

| | | | |
|---|---|---|---|
| 2,445,555 A | 7/1948 | Binda ............................. 88/65 |
| 4,007,396 A | 2/1977 | Wisbey et al. ............... 313/500 |
| 4,100,455 A | 7/1978 | DuBois ......................... 313/496 |
| 4,294,935 A * | 10/1981 | Kodera et al. ................. 525/60 |
| 4,416,946 A * | 11/1983 | Bolt ............................. 428/421 |
| 4,747,674 A | 5/1988 | Butterfield et al. .......... 350/399 |
| 4,802,745 A * | 2/1989 | Okada et al. ................. 359/491 |
| 4,803,402 A | 2/1989 | Raber et al. ................. 313/509 |
| 4,963,788 A | 10/1990 | King et al. ................... 313/503 |
| 5,015,072 A | 5/1991 | Howell ..................... 350/276 R |
| 5,047,272 A * | 9/1991 | Hassel et al. .................. 428/40 |
| 5,066,108 A | 11/1991 | McDonald ..................... 359/65 |
| 5,082,601 A * | 1/1992 | Okada et al. ................. 252/585 |
| 5,666,223 A | 9/1997 | Bennett et al. |
| 5,796,509 A | 8/1998 | Doany et al. ................. 359/254 |
| 5,886,799 A | 3/1999 | Molteni et al. ................. 359/15 |
| 5,926,293 A | 7/1999 | Ralli |
| 6,025,897 A | 2/2000 | Weber et al. .................. 349/96 |
| 6,141,070 A | 10/2000 | Kaneko |

FOREIGN PATENT DOCUMENTS

| | | | |
|---|---|---|---|
| JP | 362275202 | * 11/1987 | ................. 359/491 |
| JP | 10260395 | 9/1998 | |
| WO | WO 00/65385 | 11/2000 | |
| WO | WO 01/31393 A1 | 5/2001 | |
| WO | WO 02/10845 A2 | 2/2002 | |

OTHER PUBLICATIONS

Plastics In Flat Panel Displays (XP–001094690), Polaroid Corporation, Cambridge, MA Joseph DelPico, Program Manager—Flat Panel Displays; Giorgio Trapani, Chief Scientist—Polarizer Division; John Branca, Director of Research—Holographic Division. No. 150, Apr. 29–30, 1998, pp. 105–110. Germany.

John J. Cael et al., High Durability KE Polarizers for LCD Applications, Polaroid Corporation pp. 1–5, copyright 1995, document dated Jul. 26, 2000.

* cited by examiner

Primary Examiner—James Dudek
(74) Attorney, Agent, or Firm—Kirkpatrick & Lockhart LLP

(57) ABSTRACT

A liquid crystal display structure includes a liquid crystal display cell having a front surface and a back surface. One or more intrinsic polarizers lacking protective coatings thereon, such as K-type polarizers and thin KE polarizer sheets, are disposed adjacent to the front and back surfaces of the liquid crystal display cell. Alternatively, thinly cladded or encased iodine polarizers are disposed adjacent to the front and back surfaces of the liquid crystal display cell. The liquid crystal display structure may be used in conjunction with other optical display elements to enhance the brightness and contrast of the liquid crystal display.

23 Claims, 5 Drawing Sheets

POLARIZERS FOR USE WITH LIQUID CRYSTAL DISPLAYS

TECHNICAL FIELD

This invention relates to liquid crystal displays, and more particularly to polarizers for use with liquid crystal displays.

BACKGROUND

Liquid crystal displays are optical displays used in devices such as laptop computers, hand-held calculators and digital watches. A typical liquid crystal display includes a liquid crystal display cell and an electrode matrix disposed between a pair of absorbing polarizers. The liquid crystal display cell contains, e.g., twisted nematic or super twisted nematic molecules. In the liquid crystal display, the optical state of portions of the liquid crystal display cell is altered by the application of an electric field using the electrode matrix. This creates an optical contrast for light passing through the liquid crystal display cell that results in the appearance of pixels of polarized light on the liquid crystal display.

A typical liquid crystal display includes a front polarizer and a rear polarizer. These polarizers may be plane polarizers that absorb light of one polarization orientation more strongly than they absorb light of the orthogonal polarization orientation. The transmission axis of the front polarizer is usually crossed with the transmission axis of the rear polarizer in a liquid crystal display. The angle by which these transmission axes are crossed can vary from zero degrees to ninety degrees.

In general, unpolarized ambient light waves vibrate in a large number of directions without having a single characterizing electromagnetic radiation vector. By contrast, plane polarized light consists of light waves having a direction of vibration along a single electromagnetic radiation vector. Also, circularly polarized light has a direction of vibration along an electromagnetic radiation vector that rotates as the light propagates through space. Polarized light has many applications in electro-optical devices, such as the use of plane and circular polarizing filters to reduce glare in displays.

Further, much commercial attention has been directed to the development and improvement of flat panel displays, particularly thin, compact flat panel displays. A problem encountered in the construction of plastic flat panel displays is the development of "black spots," which arise from the formation of bubbles in the liquid crystal material from gas that has permeated through the plastic display materials. Another problem associated with plastic flat panel displays is moisture contamination of the liquid crystal display cell. These problems are avoided in conventional liquid crystal displays by using low permeability glass substrates instead of plastic. With respect to plastic flat panel displays, these problems are addressed by adding additional gas and moisture barrier layers to the liquid crystal display structure and/or the plastic substrates. However, adding such gas and moisture barrier layers increases the thickness, weight and cost of the displays.

Polarizers in the form of synthetic polarizing films exhibit comparative ease of manufacture and handling and comparative ease with which they may be incorporated into electro-optical devices such as flat panel displays. In general, plane polarizing films have the property of selectively passing radiation vibrating along a given electromagnetic radiation vector and absorbing electromagnetic radiation vibrating along a second electromagnetic radiation vector based on the anisotropic character of the transmitting film medium. Plane polarizing films include dichroic polarizers, which are absorbing plane polarizers utilizing the vectorial anisotropy of their absorption of incident light waves. The term "dichroism" refers to the property of differential absorption of the components of incident light, depending on the vibration directions of the component light waves. Light entering a dichroic plane polarizing film encounters two different absorption coefficients along transverse planes, one coefficient being high and the other coefficient being low. Light emerging from a dichroic film vibrates predominantly in the plane characterized by the low absorption coefficient.

Dichroic plane polarizing films include H-type (iodine) polarizers and dyestuff polarizers. For example, an H-type polarizer is a synthetic dichroic sheet polarizer including a polyvinyl alcohol-iodine complex. Such a chemical complex is referred to as a chromophore. The base material of an H-type polarizer is a water-soluble high molecular weight substance, and the resulting film has relatively low moisture and heat resistance and tends to curl, peel or otherwise warp when exposed to ambient atmospheric conditions. Further, H-type polarizers are inherently unstable, and require protective cladding, e.g., layers of cellulose triacetate, on both sides of the polarizer to prevent degradation of the polarizer in a normal working environment such as in a liquid crystal display.

In contrast to H-type polarizers and other similar synthetic dichroic plane polarizers are intrinsic polarizers and thinly cladded or encapsulated polarizers. Intrinsic polarizers polarize light due to the inherent chemical structure of the base material used to form the polarizer. Such intrinsic polarizers are also typically thin and durable. Examples of intrinsic polarizers are K-type polarizers. A thinly cladded or encapsulated polarizer may be, e.g., an iodine polarizer coated on both surface with polymer coatings each having a thickness of only about 5 microns, and is also thin and durable.

A K-type polarizer is a synthetic dichroic plane polarizer based on molecularly oriented polyvinyl alcohol (PVA) sheets or films with a balanced concentration of light-absorbing chromophores. A K-type polarizer derives its dichroism from the light absorbing properties of its matrix, not from the light-absorbing properties of dye additives, stains, or suspended crystalline materials. Thus, a K-type polarizer may have both good polarizing efficiency and good heat and moisture resistance. A K-type polarizer may also be very neutral with respect to color.

An improved K-type polarizer, referred to as a KE polarizer, is manufactured by 3M Company, Norwood, Mass. The KE polarizer has improved polarizer stability under severe environmental conditions, such as high temperatures and high humidity. In contrast to H-type polarizers, in which the light absorption properties are due to the formation of a chromophore between PVA and tri-iodide ion, KE polarizers are made by chemically reacting the PVA by an acid catalyzed, thermal dehydration reaction. The resulting chromophore, referred to as polyvinylene, and the resulting polymer may be referred to as a block copolymer of vinylalcohol and vinylene.

For H-type polarizers, stability is achieved by sandwiching the polarizer between two plastic substrates, such as two layers of cellulose triacetate, one on each side of the polarizer. However, even in these structures the application of heat, humidity and/or vacuum can adversely affect the properties of the polarizer. By contrast, K-type polarizers such as KE polarizers do not need to be sandwiched between sheets of cellulose triacetate. The polyvinylene chromophore of the KE polarizer is an extremely stable chemical entity, since the chromophore is intrinsic to the polymer molecule. This chromophore is thermally stable as well as resistant to attack from a wide range of solvents and chemicals.

A K-type polarizer such as a KE polarizer has several advantages over other types of polarizers, e.g., iodine and dyestuff polarizers. K-type polarizers have more durable chromophores, are thinner, and may be designed with variable transmission levels. Most notably, K-type polarizers such as KE polarizers may be used in applications that require high performance under severe environmental conditions, including high temperatures and high humidity, such as 85° C. and 85% relative humidity, for extended periods of time. Under such extreme environmental conditions, the stability of iodine polarizers is greatly reduced, thus limiting their usefulness in applications such as flat panel displays. Due to the inherent chemical stability of K-type polarizers, a wide variety of adhesive formulations, including pressure sensitive adhesives, can be applied directly to K-type polarizers. Further, a single-sided plastic support is adequate to give physical support for K-type polarizers, and since this support can be located outside the optical path of the liquid crystal display module, it need not be optically isotropic and lower-cost substrates such as polyethylene terephthalate (PET) are acceptable alternatives. Moreover, the ability to construct single-sided laminates allows the optical structures to be thinner, allowing for additional flexibility in the design and manufacture of flat panel display elements. These advantages of K-type polarizers may be used in a wide variety of optical applications, including flat panel displays.

In contrast to a plane polarizer, a circular polarizer may be constructed of a plane polarizer and a quarter-wavelength retarder. A quarter-wavelength retarder shifts the phase of light waves propagating along one plane through the retarder by one-quarter wavelength, but does not shift the phase of light waves propagating through the retarder along a transverse plane. The result of combining light waves that are one-quarter wavelength out of phase and that vibrate along perpendicular planes is circularly polarized light, for which the electromagnetic radiation vector rotates as the combined light waves travel through space.

Circularly polarized light may be described with respect to two distinct polarization states: left-handed (L) and right-handed (R) circularly polarized light. A circular polarizer absorbs light of one of these polarization states and transmits light of the other polarization state. The use of circular polarizers to reduce glare in displays is well known. In particular, light from an emissive display can be selectively transmitted through a circular polarizer, while background ambient light reflected in the display, which causes glare, may be reduced or eliminated.

A conventional liquid crystal display stack 10 is shown in FIG. 1. A liquid crystal display cell 12 has two surfaces coated with layers 14, 16 of an adhesive, e.g., a pressure sensitive adhesive, to secure polarizer structures to both surfaces of the liquid crystal display cell. The polarizer structures each include plane polarizers 18, 20, e.g., H-type polarizers, which have layers 22, 24, 26, 28 of cellulose triacetate as a protective cladding coated or laminated on both surfaces thereof. Liquid crystal display stack 10 also typically includes a transflector or reflector 30 attached to the back side of the display by an adhesive layer 32, e.g., a pressure sensitive adhesive, the transflector or reflector functioning to enhance the brightness and contrast of the liquid crystal display. H-type polarizers 18, 20 each typically have a thickness of approximately 20 microns, each of the layers of cellulose triacetate 22, 24, 26, 28 is typically approximately 80 microns thick, and pressure sensitive adhesive layer 32 typically has a thickness of approximately 25 microns.

SUMMARY

In general, in one aspect, the invention features a liquid crystal display structure including a liquid crystal display cell having a front surface and a back surface. A front intrinsic polarizer is disposed adjacent to the front surface of the liquid crystal display cell, the front intrinsic polarizer lacking a protective coating thereon.

Implementations of the invention may also include one or more of the following features. The liquid crystal display structure may include a back intrinsic polarizer disposed adjacent to the back surface of the liquid crystal display cell, the back intrinsic polarizer lacking a protective coating thereon.

The front intrinsic polarizer may be a K-type polarizer, a KE polarizer sheet, or a thin film. The front intrinsic polarizer has a first surface disposed adjacent to the front surface of the liquid crystal display cell, the liquid crystal display structure further including an adhesive layer disposed on the first surface of the front intrinsic polarizer to attach the intrinsic polarizer to the liquid crystal display cell.

The adhesive layer may include a pressure sensitive adhesive or a diffuse adhesive. The liquid crystal display structure may include a removable release liner disposed adjacent to the front intrinsic polarizer. The liquid crystal display structure may include a polyethylene terephthalate support layer disposed adjacent to the front intrinsic polarizer.

The liquid crystal display structure may include a transflective coating disposed adjacent to the back intrinsic polarizer. The liquid crystal display structure may include a retarder or a liquid crystal polymer coating disposed adjacent to the front intrinsic polarizer.

The liquid crystal display structure may include a transflector disposed adjacent to the back intrinsic polarizer. The transflector may include a layer of metal, a tilted mirror film, or a holographic element. The back intrinsic polarizer may have a first surface disposed adjacent to the back surface of the liquid crystal display cell and a second surface, the liquid crystal display structure further including a microreplicated structure formed on the second surface of the back intrinsic polarizer. The liquid crystal display structure may include a reflective diffuse polarizer film disposed adjacent to the back intrinsic polarizer.

In general, in another aspect, the invention features a liquid crystal display structure including a liquid crystal display cell having a first surface. An intrinsic polarizer has a first surface disposed adjacent to the front surface of the liquid crystal display cell and a second surface, the intrinsic polarizer lacking a protective coating thereon. A conductor is disposed adjacent to the second surface of the intrinsic polarizer.

Implementations of the invention may also include the following feature. The intrinsic polarizer may be a K-type polarizer.

In general, in another aspect, the invention features a liquid crystal display structure, including a liquid crystal display cell having a front surface and a back surface. A front K-type polarizer is disposed adjacent to the front surface of the liquid crystal display cell, the front K-type polarizer lacking a protective coating thereon. A back K-type polarizer is disposed adjacent to the back surface of the liquid crystal display cell, the back K-type polarizer lacking a protective coating thereon.

In general, in another aspect, the invention features a liquid crystal display structure including a liquid crystal display cell having a front surface and a back surface. A front thinly cladded iodine polarizer is disposed adjacent to the front surface of the liquid crystal display cell, the front thinly cladded iodine polarizer lacking a protective coating thereon.

Implementations of the invention may also include the following feature. The liquid crystal display structure may include a back thinly cladded iodine polarizer disposed adjacent to the back surface of the liquid crystal display cell, the back thinly cladded iodine polarizer lacking a protective coating thereon.

An advantage of the present invention is elimination of the need for protective cladding of the polarizers in the liquid crystal display stack, resulting in significant reduction in the thickness of the liquid crystal display. Thus, an additional advantage of the invention is the ability to manufacture thinner and lighter-weight liquid crystal displays. Another advantage of the present invention is that an intrinsic polarizer such as a K-type polarizer provides stable performance over a wide range of transmission levels. A further advantage of the present invention is increased brightness of liquid crystal displays using K-type polarizers compared to currently manufactured liquid crystal displays, with resulting lower energy requirements for illumination of the display.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

The present invention relates to the use of intrinsic polarizers disposed adjacent to either the front surface or the rear surface, or both, of a liquid crystal display cell. Alternatively, thinly cladded or encased iodine polarizers may be disposed adjacent to either or both surfaces of a liquid crystal display cell.

Figure 1:
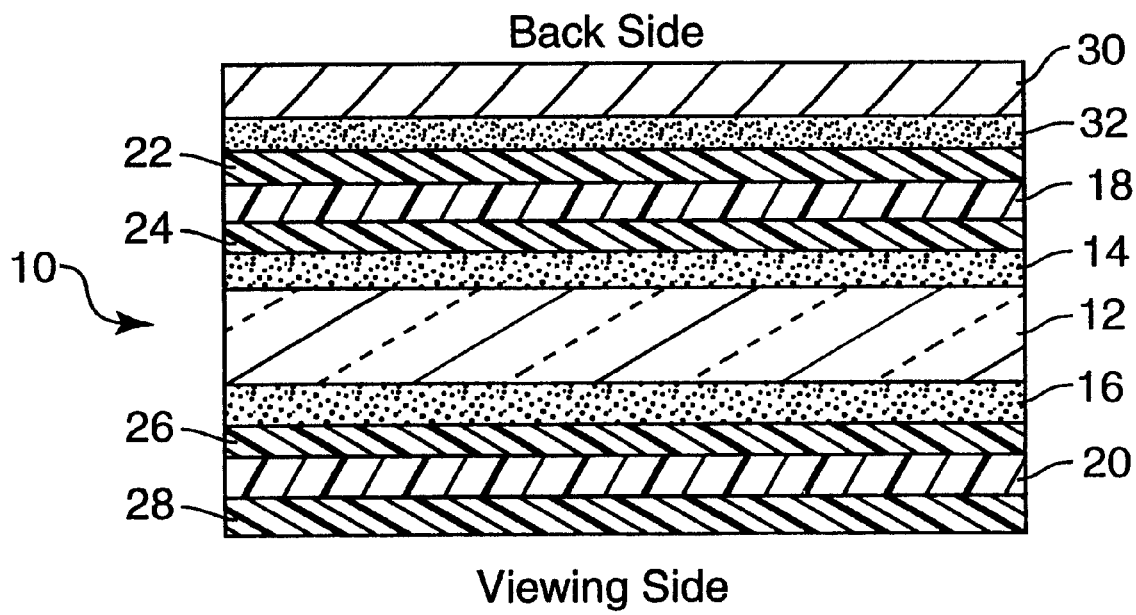
FIG. 1 is a cross sectional view of a conventional liquid crystal display stack.
Figure 2:
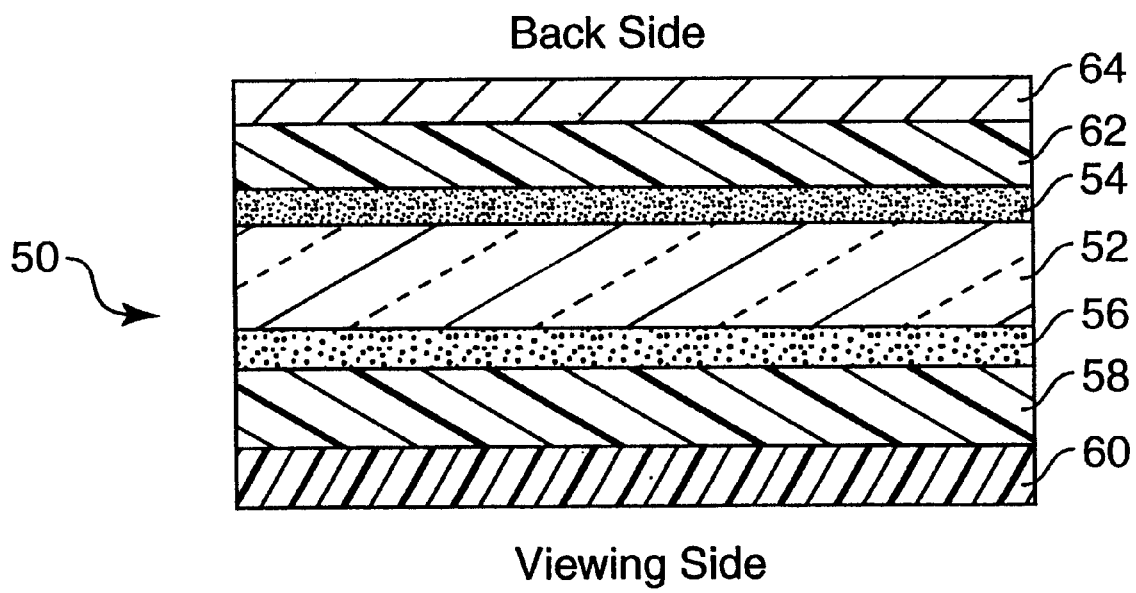
FIG. 2 is a cross sectional view of a liquid crystal display stack according to the present invention.

FIG. 2 shows a liquid crystal display stack 50 according to the present invention. A liquid crystal display cell 52 is coated with layers 54, 56 of an adhesive, e.g., a pressure sensitive adhesive such as Polatechno AD-20, to secure polarizer structures to the liquid crystal display cell, similar to liquid crystal display stack 10 shown in FIG. 1. On the viewing side of liquid crystal display stack 50, an intrinsic polarizer 58, preferably a K-type or thin KE polarizer sheet, is attached to liquid crystal display cell 52 using adhesive layer 56. K-type polarizer 58 typically has a thickness of approximately 20 microns. Such a KE polarizer may be a sheet of the type manufactured by 3M Company, Norwood, Mass. K-type polarizer 58 may also include a supporting substrate in the form of a polyethylene terephthalate (PET) support layer 60 on its surface facing the viewing side of the liquid crystal display. PET support layer 60 typically has a thickness of approximately 25–180 microns. However, liquid crystal display stack 50 does not require a supporting substrate such as PET support layer 60; for example, a KE polarizer sheet may itself be attached to a display.

On the back side of liquid crystal display stack 50, another intrinsic polarizer 62 such as a K-type or thin KE polarizer sheet is attached to liquid crystal display cell 52 using adhesive layer 54. K-type polarizer 62 also typically has a thickness of approximately 20 microns. A transflector or reflector 64 may be disposed on the surface of K-type polarizer 62 facing the back side of the liquid crystal display to enhance the brightness and contrast of the liquid crystal display.

Using intrinsic polarizers in the liquid crystal display stack eliminates the need for protective cladding of the polarizers. The cladding used for other types of polarizers, e.g., H-type polarizers, is generally a layer of cellulose triacetate disposed on both sides of the polarizer. Removing the cladding layers of cellulose triacetate results in a significant reduction in the thickness of the liquid crystal display stack. For example, liquid crystal display stack 50 of FIG. 2, including PET support layer 60 and transflector or reflector 64, is approximately 300 microns thinner than the corresponding liquid crystal display stack 10 of FIG. 1.

Further, the K-type polarizers used in liquid crystal display stack 50 could provide an effective gas and moisture permeability barrier to the liquid crystal material in the liquid crystal display cell. Thus, no additional barrier layers or cladding may be needed in a liquid crystal display structure constructed with a K-type polarizer disposed on each side of the liquid crystal display cell to achieve desired permeability specifications. In particular, a standard for moisture vapor transmission rate (MVTR), ASTM F1249, is less than 20 gm/m²/day, and the oxygen transmission rate (O2GTR), ASTM D3985, is less than 1 ml/m²/day. Structures for liquid crystal displays formed using KE polarizers, including PET support structures, have been shown to have a MVTR of 4.6 or less gm/m2/day and an O2GTR of less than 0.005 ml/m²/day (tested at 20° C. and 90% relative humidity).

Although the present description refers to intrinsic polarizers, thinly cladded or encased iodine polarizer may be substituted for either or both intrinsic polarizers. A thinly cladded polarizer includes an iodine polarizer sheet coated on both surfaces with polymer coatings each having a thickness of about 5 microns. A thinly cladded polarizer is thin and durable, similar to an intrinsic polarizer such as a K-type polarizer.

Figure 3:
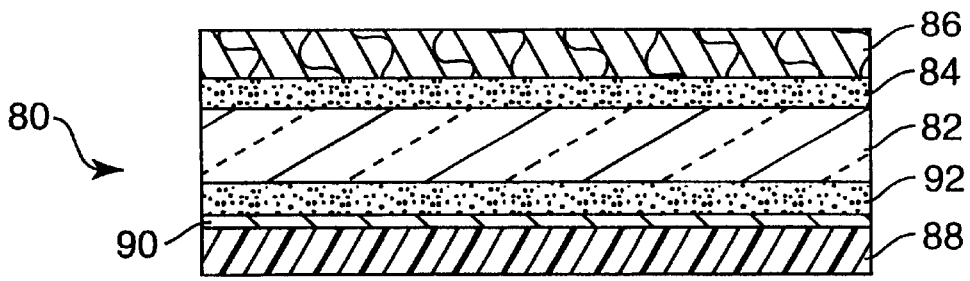
FIG. 3 is a cross sectional view of an alternative polarizer structure that may be attached to the back side of a liquid crystal display device.

FIG. 3 shows an alternative polarizer structure 80 that may be attached to the back side of a liquid crystal display device. An intrinsic polarizer 82 such as a K-type or thin KE polarizer sheet may have an adhesive layer 84, e.g., a pressure sensitive adhesive, on one of its surfaces, which adhesive layer is covered by a removable release liner 86 prior to attaching polarizer structure 80 to the liquid crystal display. For example, the typical thickness of KE polarizer 82 is approximately 15–35 microns, the typical thickness of pressure sensitive adhesive coating 84 is approximately 16–35 microns, and the typical thickness of release liner 86 is approximately 25–50 microns. Further, KE polarizer 82 may be laminated onto release liner 86 having pressure sensitive adhesive coating 84 previously applied thereon. A PET support layer 88 having a transflective coating 90 may be attached to the other surface of intrinsic polarizer 82 by an adhesive layer 92. Since one surface of a KE polarizer sheet typically comprises a PET layer, an adhesive other than a pressure sensitive adhesive may be used, e.g., a coated adhesive that is thermally cured such as a copolyester adhesive that is crosslinked using multifunctional isocyanates. Transflective coating 90 functions to enhance the brightness and contrast of the liquid crystal display. Transflective coating 90, which typically has a thickness of approximately 8–20 microns, may be coated on or laminated onto PET support layer 88. The transflective coating may be, e.g., a nacreous pigment coated onto PET such as commercially available STR400 from Nippon Paper or a transflector available from Teijin. The typical thickness of adhesive layer 92 is approximately 4–20 microns, and the typical thickness of PET support layer 88 is approximately 12–100 microns.

Figure 4:
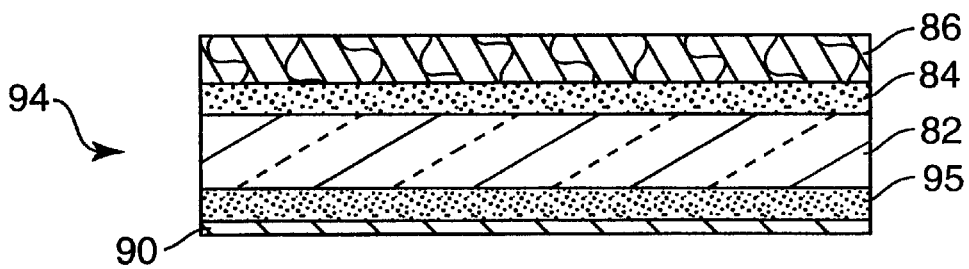
FIG. 4 is a cross sectional view of an alternative polarizer structure to that shown in FIG. 3.

FIG. 4 shows an alternative polarizer structure 94 to that shown in FIG. 3. Polarizer structure 94 includes no PET support layer. Instead, transflective coating 90 may be contained on or laminated onto intrinsic polarizer 82, which may have an adhesive layer 95, e.g., having a thickness up to approximately 20 microns, or no adhesive layer at all.

Figure 5:
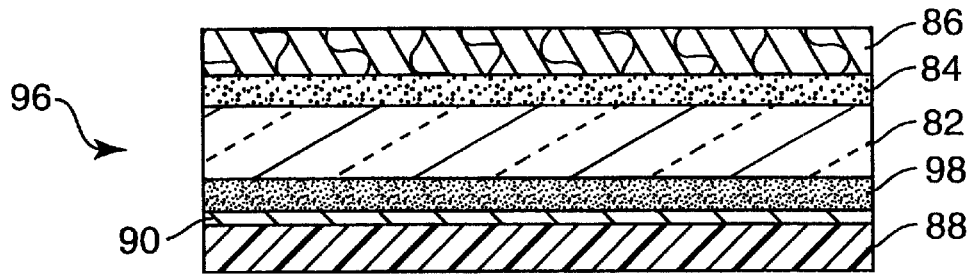
FIG. 5 is a cross sectional view of another alternative polarizer structure to that shown in FIG. 4.

FIG. 5 shows another alternative polarizer structure 96 to that shown in FIG. 3. Polarizer structure 96 has a PET support layer 88 attached to intrinsic polarizer 82 by a diffuse adhesive layer 98. Diffuse adhesive 98, which typically has a thickness of approximately 12–40 microns, functions similarly to the combination of an adhesive layer and a transflective coating to enhance the brightness of the liquid crystal display and to attach PET support layer 88 to intrinsic polarizer 82. For example, diffuse adhesive 98 may be a pressure sensitive adhesive to which glass beads have been added to scatter light passing through the adhesive.

Figure 6:
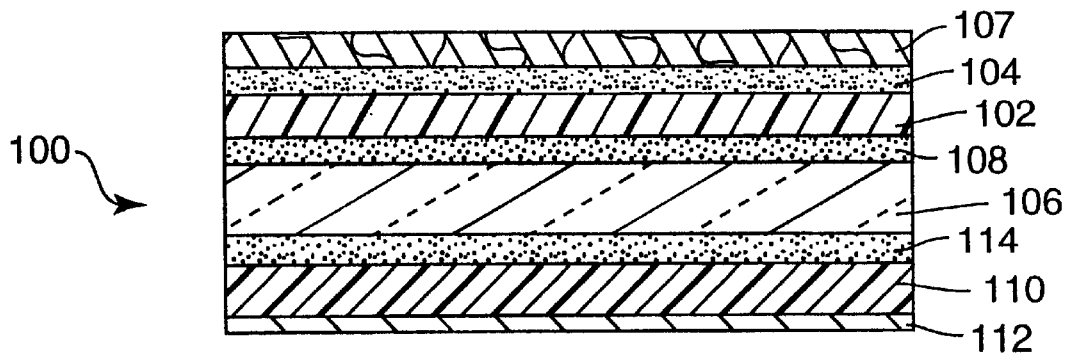
FIG. 6 is a cross sectional view of an alternative polarizer structure that may be attached to the viewing side of a liquid crystal device.

FIG. 6 shows an alternative polarizer structure 100 that may be attached to the front surface of a liquid crystal device. A retarder 102 such as a quarter-wavelength retarder has an adhesive layer 104, e.g., a pressure sensitive adhesive, on one of its surfaces, which adhesive layer is covered by a removable release liner 107 prior to attaching polarizer structure 100 to the liquid crystal display. Retarder 102 is preferably a thin film, broadband quarter-wavelength retarder effective over all or a substantial portion of the visible electromagnetic spectrum, such as the broadband quarter-wavelength retarders manufactured by Teijin. For example, the typical thickness of quarter-wavelength retarder 102 is approximately 30–60 microns, the typical thickness of pressure sensitive layer 104 is approximately 16–35 microns, and the typical thickness of release liner 107 is approximately 25–50 microns.

An intrinsic polarizer 106 such as a K-type or thin KE polarizer sheet has an adhesive layer 108, on one of its surfaces, which adhesive layer is attached to the other surface of retarder 102. The typical thickness of KE polarizer 106 is approximately 15–35 microns, and the typical thickness of adhesive layer 108 is approximately 5–30 microns.

A PET support layer 110 having an antireflective coating 112 may be attached to the other surface of intrinsic polarizer 106 by an adhesive layer 114. Antireflective coating 112, which typically has a thickness of less than 1 micron, may be made from a low index of refraction thermopolymer such as Kynar 1702 and may be coated on one surface of PET support layer 110. The typical thickness of adhesive layer 92 on the other surface of PET support layer 110 is approximately 5–30 microns, and the typical thickness of PET support layer 110 itself is approximately 12–100 microns.

Figure 7:
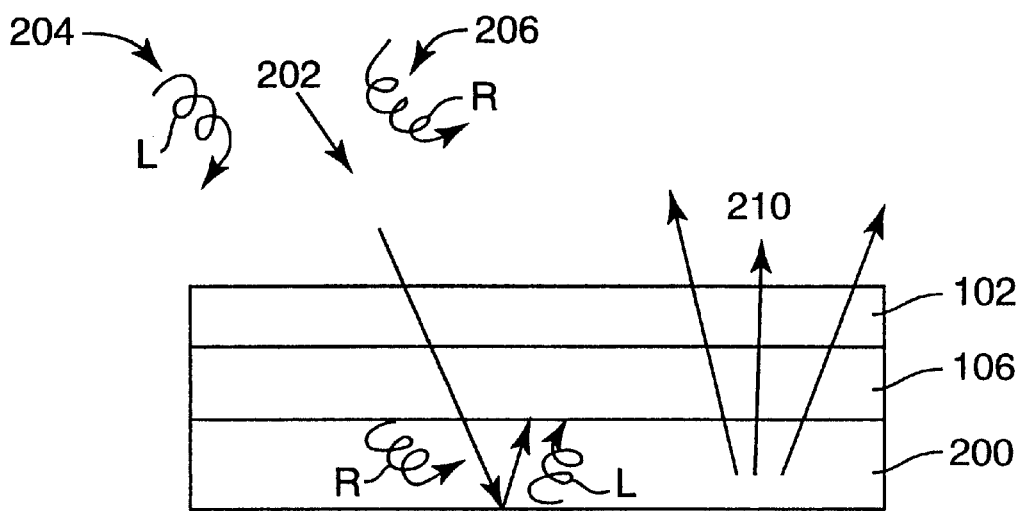
FIG. 7 is a cross sectional view of a liquid crystal display module with a circular polarizer.

The combination of intrinsic polarizer 106 with retarder 102 acts as a circular polarizer, which significantly reduces the intensity of undesirable reflected ambient light, thereby increasing the contrast of the image formed by the emitted signal from the display. As shown in FIG. 7, unpolarized ambient light 202 may be represented as a combination of left-handed (L) 204 and right-handed (R) 206 circularly polarized light components. When unpolarized ambient light 202 enters liquid crystal display 200, one circularly polarized component of the ambient light, e.g., left-handed circular polarized light 204, is absorbed by the combination of polarizer 106 with retarder 102, while the other component, the right-handed circularly polarized light 206, is transmitted through the liquid crystal display. The transmitted right-handed circularly polarized light 206 is specularly reflected in the liquid crystal display. However, the handedness of circularly polarized light is reversed upon specular reflection, and the transmitted right-handed circularly polarized light 206 becomes left-handed circularly polarized light. The reflected left-handed circularly polarized light is reflected toward the combination of polarizer 106 with retarder 102, where it is absorbed in the same manner as the left-handed circularly polarized component 204 of ambient light 202. Thus, both the left-handed and right-handed circularly polarized components of the ambient light are absorbed by the combination of polarizer 106 and retarder 102, which acts as a circular polarizer, during transmission through and reflection in liquid crystal display 200 so that they do not interfere with an emitted light signal 210.

Figure 8:
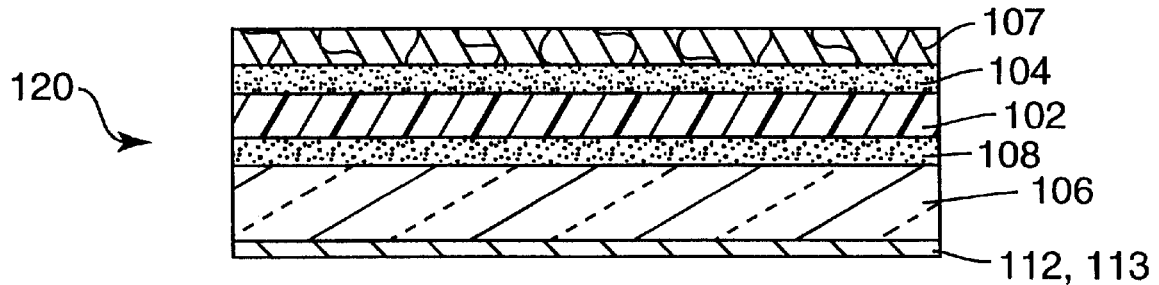
FIG. 8 is a cross sectional view of an alternative polarizer structure to that shown in FIG. 6.

FIG. 8 shows an alternative polarizer structure 120 to that shown in FIG. 6. Polarizer structure 120 includes no PET support layer. Instead, antireflective coating 112 or alternatively a hard coat 113 may be coated on or laminated onto intrinsic polarizer 106. Hard coat 113, which typically has a thickness of 1–6 microns, may be made, e.g., from an acrylate such as poly methyl methacrylate. Hard coat 113 may be either matte or clear.

Figure 9:
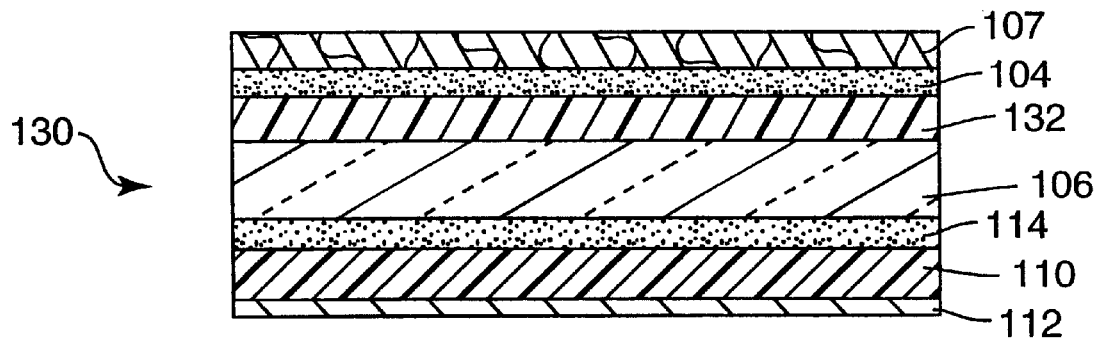
FIG. 9 is a cross sectional view of another alternative polarizer structure to that shown in FIG. 6.

FIG. 9 shows another alternative polarizer structure 130 to that shown in FIG. 6. In polarizer structure 130, retarder 102 and adhesive layer 108 are replaced by a liquid crystal polymer coating 132 disposed on intrinsic polarizer 106. Liquid crystal polymer coating 132, which typically has a thickness of up to approximately 100 microns, performs the function of enhancing the thickness of the liquid crystal display similar to retarder 102 of FIG. 6.

Figure 10:
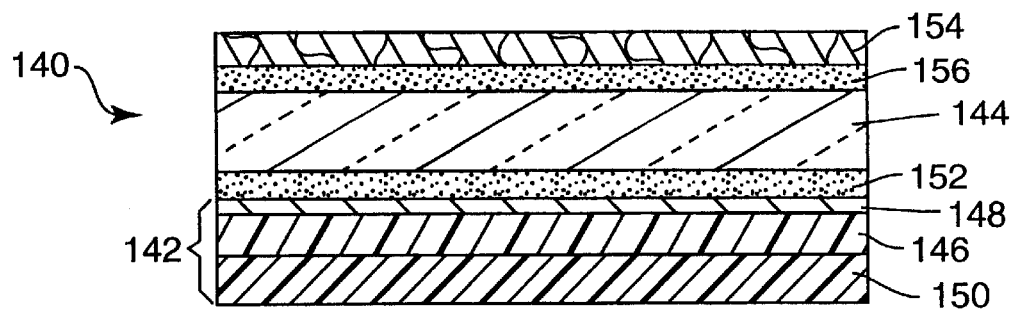
FIG. 10 is a cross sectional view of an alternative polarizer structure that may be attached to the back side of a liquid crystal device.

FIG. 10 shows an alternative polarizer structure 140 with enhanced brightness that may be attached to the back side of a liquid crystal device. In polarizer structure 140, a holographic element transflector known as Light Intensifying Film Technology (LIFT) 142 is laminated to an intrinsic polarizer 144 such as a K-type or thin KE polarizer sheet. As set forth in U.S. Pat. No. 5,886,799, LIFT includes a micro replicated structure 146 metalized with a layer of aluminum 148 that is formed on a PET support layer 150. The microreplicated surface of LIFT layer 142 may be attached to one surface of intrinsic polarizer 144 with an adhesive layer 152, e.g., a pressure sensitive adhesive. A release liner 154 may be attached to the other surface of intrinsic polarizer 144 by another adhesive layer 156, e.g., a pressure sensitive adhesive. LIFT layer 142 enhances the brightness of the liquid crystal display by directing light transmitted through the liquid crystal display toward a region normal to the display's surface.

Figure 11:
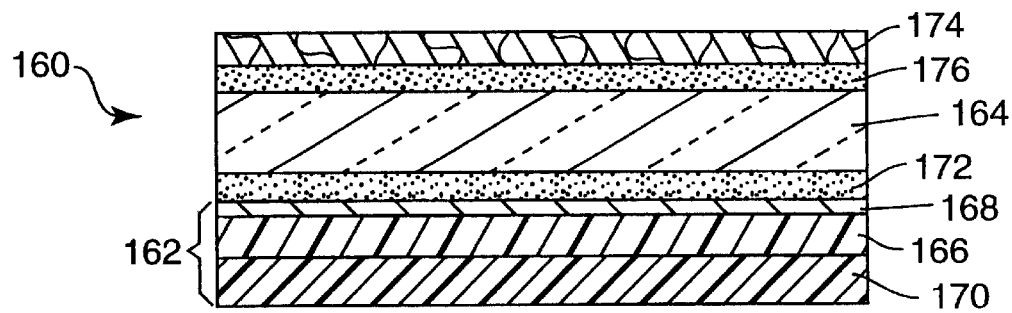
FIG. 11 is a cross sectional view of another alternative polarizer structure that may be attached to the back side of a liquid crystal device.

FIG. 11 shows another alternative polarizer structure 160 with enhanced brightness that may be attached to the back side of a liquid crystal device. In polarizer structure 160, a transflector known as Tilted Mirror Film (TMF) 162 is laminated to an intrinsic polarizer 164 such as a K-type or thin KE polarizer sheet. TMF 162 includes a microreplicated structure 166 metalized with a layer of silver 168 that is formed on a PET support layer 170. The microreplicated surface of TMF layer 162 may be attached to one surface of K-type polarizer 164 with an adhesive layer 172, e.g., an optically clear pressure sensitive adhesive. A release liner 174 may be attached to the other surface of K-type polarizer 164 by another adhesive layer 176, e.g., an optically clear pressure sensitive adhesive. Alternatively, either adhesive layer 172 or adhesive layer 176 may be a diffuse pressure sensitive adhesive that diffusely scatters light.

Figure 12:
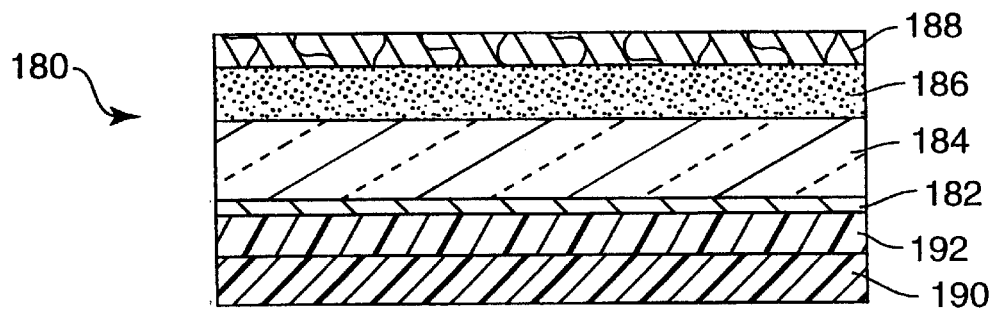
FIG. 12 is a cross sectional view of polarizer structure that can be attached to the back side of a liquid crystal device that is an alternative to the polarizer structures of FIGS. 10 and 11.

FIG. 12 shows a polarizer structure 180 with enhanced brightness that can be attached to the back side of a liquid crystal device that is an alternative to the polarizer structures of FIGS. 10 and 11. In particular, a simple transflector 182 in the form of a layer of metal such as silver or aluminum applied directly to one surface of an intrinsic polarizer 184 acts as a polarized mirror to reflect polarized light and enhance the brightness of the liquid crystal display. Transflector 182 may be formed by sputtering, vacuum depositing, or otherwise coating a layer of silver or aluminum to K-type polarizer 184. Another example of a transflector is a coating of mica on a polymer or adhesive matrix.

The use of a non-depolarizing, diffuse pressure sensitive adhesive layer 186 to attach a release liner 188 to intrinsic polarizer 184 further diffuses polarized light to enhance the brightness of the liquid crystal display. Alternatively, for a silver transflector 182, a PET support layer 190 may be attached to the transflector by an adhesive layer 192, e.g., a pressure sensitive adhesive. As an additional alternative, silver transflector 182 may be disposed on a non-birefringent carrier (not shown) attached to K-type polarizer 184. Such a non-birefringent carrier may be, e.g., cellulose triacetate, a diacetate, or Transphan.

Figure 13:
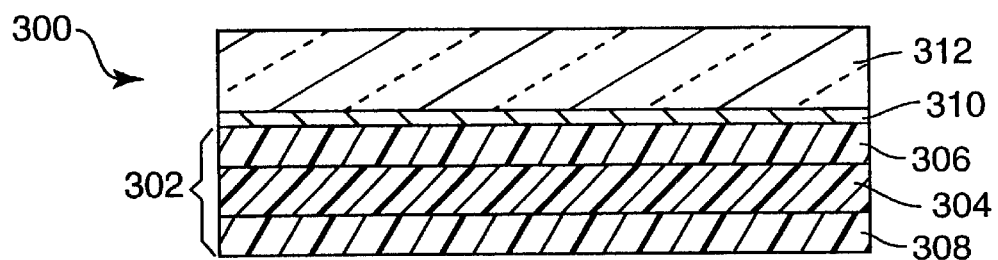
FIG. 13 is a cross sectional view of a polarizer structure using an intrinsic polarizer as a substrate for a conductor in a liquid crystal display.

FIG. 13 shows a polarizer structure 300 using an intrinsic polarizer as a substrate for a conductor in a liquid crystal display without requiring any adhesive. In polarizer structure 300, a conductor 302 in the form of a metal layer 304, e.g., aluminum, disposed between layers of indium tin oxide (ITO) 306, 308 is attached to a hard coat 310 deposited or coated directly onto K-type polarizer 312. A conductor pattern may then be etched into layers 304, 306, 308 of conductor 302.

Figure 14A:
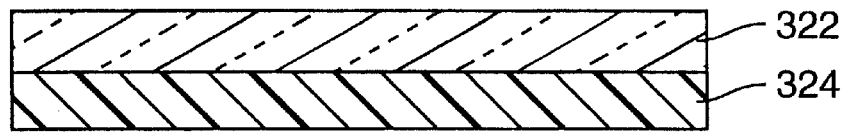
FIGS. 14A–14C are cross sectional views of a polarizer structure being formed using an intrinsic polarizer as a substrate for a microreplicated structure.
Figure 14B:
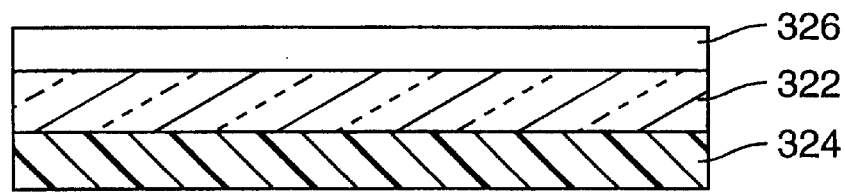
Figure 14C:
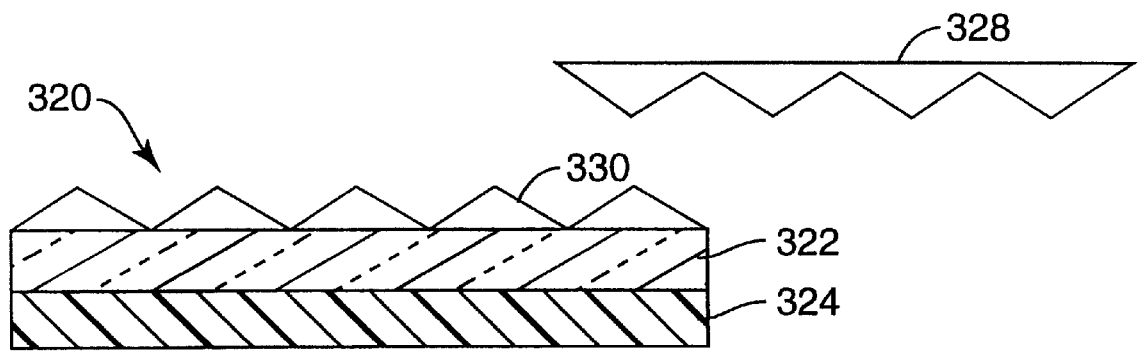

FIGS. 14A–14C show how a polarizer structure 320 may be formed using an intrinsic polarizer as a substrate for a microreplicated structure. FIG. 14A shows an intrinsic polarizer 322, e.g., a K-type or thin KE polarizer sheet, having a carrier or support layer 324 attached by an adhesive (not shown). Carrier layer 324 is not required to use intrinsic polarizer 322 as a substrate for a microreplicated structure. In FIG. 14B, a layer of an ultraviolet-curable resin 326 is disposed on the surface of intrinsic polarizer 322 opposite to the surface attached to carrier layer 324. Prior to curing resin 326, a microreplicating tool 328 is applied to resin 326 to form a microreplicated structure 330 (FIG. 14C). With tool 328 applied to the resin, resin 326 is then cured to set the microreplicated structure, and then tool 328 is removed. Microreplicated structure 330 enhances the brightness of the liquid crystal display by directing light transmitted through the liquid crystal display toward a region normal to the display's surface.

Figure 15:
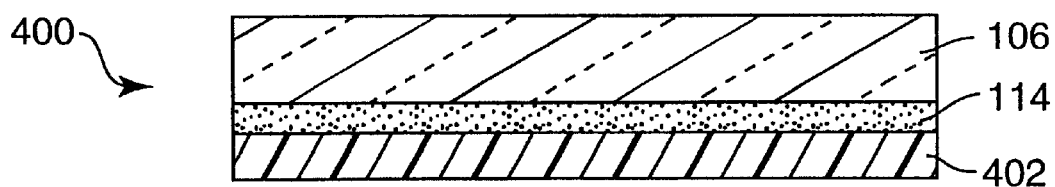
FIG. 15 is a cross sectional view of a polarizer structure using an intrinsic polarizer attached to a reflective diffuse polarizer film.

FIG. 15 shows an alternative polarizer structure 400 that may be attached to the rear surface of a liquid crystal display device. A reflective diffuse polarizer film 402 is a multilayer polymer film that functions as a reflective polarizer, i.e., as a white, non-inverting filter than enhances the appearance of the liquid crystal display. Reflective diffuse polarizer film 402 may be attached to intrinsic polarizer 106 with an adhesive layer 114. Reflective diffuse polarizer film 402 may also be a specular reflective polarizer with a diffuse adhesive or a diffuse reflective polarizer with a clear adhesive.

A number of embodiments of the invention have been described. Nevertheless, it will be understood that various modifications may be made without departing from the spirit and scope of the invention. Accordingly, other embodiments are within the scope of the following claims.

What is claimed is:

1. A liquid crystal display structure comprising:
    a liquid crystal display cell having a front surface and a back surface; and
    a front intrinsic polarizer disposed adjacent to the front surface of the liquid crystal display cell, the front intrinsic polarizer lacking a protective coating thereon and providing a moisture vapor transmission rate of less than about 4.6 gm/m$^2$/day and an oxygen transmission rate of less than about 0.005 ml/m$^2$/day to the liquid crystal display structure.

2. The liquid crystal display structure of claim 1, further comprising
    a back intrinsic polarizer disposed adjacent to the back surface of the liquid crystal display cell, the back intrinsic polarizer lacking a protective coating thereon.

3. The liquid crystal display structure of claim 1, wherein the front intrinsic polarizer is a K-type polarizer.

4. The liquid crystal display structure of claim 1, wherein the front intrinsic polarizer comprises a KE polarizer sheet.

5. The liquid crystal display structure of claim 1, wherein the front intrinsic polarizer has a first surface disposed adjacent to the front surface of the liquid crystal display cell, the liquid crystal display structure further comprising an adhesive layer disposed on the first surface of the front intrinsic polarizer to attach the intrinsic polarizer to the liquid crystal display cell.

6. The liquid crystal display structure of claim 5, wherein the adhesive layer comprises a pressure sensitive adhesive.

7. The liquid crystal display structure of claim 6, wherein the adhesive layer comprises a diffuse adhesive.

8. The liquid crystal display structure of claim 1, further comprising a removable release liner disposed adjacent to the front intrinsic polarizer.

9. The liquid crystal display structure of claim 1, further comprising a polyethylene terephthalate support layer disposed adjacent to the front intrinsic polarizer.

10. The liquid crystal display structure of claim 1, further comprising a transflective coating disposed adjacent to the back intrinsic polarizer.

11. The liquid crystal display structure of claim 2, further comprising a retarder disposed adjacent to the front intrinsic polarizer.

12. The liquid crystal display structure of claim 2, further comprising a liquid crystal polymer coating disposed adjacent to the front intrinsic polarizer.

13. The liquid crystal display structure of claim 1, further comprising a transflector disposed adjacent to the back intrinsic polarizer.

14. The liquid crystal display structure of claim 13, wherein the transflector comprises a layer of metal.

15. The liquid crystal display structure of claim 13, wherein the transflector comprises a tilted mirror film.

16. The liquid crystal display structure of claim 13, wherein the transflector comprises a holographic element.

17. The liquid crystal display structure of claim 2, wherein the back intrinsic polarizer has a first surface disposed adjacent to the back surface of the liquid crystal display cell and a second surface, the liquid crystal display structure further comprising a microreplicated structure formed on the second surface of the back intrinsic polarizer.

18. The liquid crystal display structure of claim 2, further comprising a reflective diffuse polarizer film adjacent to the back intrinsic polarizer.

19. A liquid crystal display structure comprising:

a liquid crystal display cell having a front surface;

an intrinsic polarizer having a first surface disposed adjacent to the front surface of the liquid crystal display cell and a second surface, the intrinsic polarizer lacking a protective coating thereon and providing a moisture vapor transmission rate of less than about 4.6 gm/m$^2$/day and an oxygen transmission rate of less than about 0.005 ml/m$^2$/day to the liquid crystal display structure; and a conductor disposed adjacent to the second surface of the intrinsic polarizer.

20. The liquid crystal display structure of claim 19, wherein the intrinsic polarizer is a K-type polarizer.

21. A liquid crystal display structure comprising:

a liquid crystal display cell having a front surface and a back surface;

a front K-type polarizer disposed adjacent to the front surface of the liquid crystal display cell, the front K-type polarizer lacking a protective coating thereon and providing a moisture vapor transmission rate of less than about 4.6 gm/m$^2$/day and an oxygen transmission rate of less than about 0.005 ml/m$^2$/day to the liquid crystal display structure; and a back K-type polarizer disposed adjacent to the back surface of the liquid crystal display cell, the back K-type polarizer lacking a protective coating thereon.

22. An optical system comprising:

a liquid crystal display structure providing a moisture vapor transmission rate of less than about 4.6 gm/m$^2$/day and an oxygen transmission rate of less than about 0.005 ml/m$^2$/day, the liquid crystal display structure comprising a liquid crystal display cell having a front surface and a back surface and a front intrinsic polarizer disposed adjacent to the front surface of the liquid crystal display cell, the front intrinsic polarizer lacking a protective coating thereon.

23. The optical system of claim 22 wherein the liquid crystal display structure further comprises a back intrinsic polarizer disposed adjacent to the back surface of the liquid crystal display cell, the back intrinsic polarizer lacking a protective coating thereon.

* * * * *

UNITED STATES PATENT AND TRADEMARK OFFICE
CERTIFICATE OF CORRECTION

| | |
|---|---|
| PATENT NO. | : 6,630,970 B2 |
| APPLICATION NO. | : 09/897318 |
| DATED | : October 7, 2003 |
| INVENTOR(S) | : Giorgio B. Trapani |

It is certified that error appears in the above-identified patent and that said Letters Patent is hereby corrected as shown below:

In column 2, line 37, delete "surface" and insert -- surfaces --.

In column 7, line 14, delete "m2" and insert -- $m^2$ --.

In column 10, line 41, delete "than" and insert "that".

In column 12, lines 30-40, cancel the text beginning with "22. An optical system: and ending with "a protective coating thereon." And insert the following, claim:

-- 22. An optical system comprising:
a liquid crystal display structure comprising a liquid crystal display cell having a front surface and a back surface and a front intrinsic polarizer disposed adjacent to the front surface of the liquid crystal display cell, the front intrinsic polarizer lacking a protective coating thereon and providing a moisture vapor transmission rate of less than about 4.6 $gm/m^2/day$ and an oxygen transmission rate of less than about 0.005 $ml/m^2/day$ to the liquid crystal display structure. --

Signed and Sealed this

Fourth Day of September, 2007

JON W. DUDAS
*Director of the United States Patent and Trademark Office*